(12) United States Patent
Lo et al.

(10) Patent No.: US 9,323,092 B2
(45) Date of Patent: Apr. 26, 2016

(54) TOUCH PANEL (71) Applicant: HTC Corporation, Taoyuan County (TW)

(72) Inventors: Pi-Lin Lo, Taoyuan County (TW); Yen-Cheng Lin, Taoyuan County (TW); Yi-Fan Hsueh, Taoyuan County (TW); Jui-Liang Chen, Taoyuan County (TW); Yi-Cheng Li, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 140 days.

(21) Appl. No.: 13/948,181

(22) Filed: Jul. 23, 2013

(65) Prior Publication Data
US 2014/0022466 A1    Jan. 23, 2014

Related U.S. Application Data (63) Continuation-in-part of application No. 13/600,233, filed on Aug. 31, 2012.

(60) Provisional application No. 61/567,057, filed on Dec. 5, 2011.

(51) Int. Cl.
*G02F 1/1335* (2006.01)
*G02F 1/1333* (2006.01)
*G06F 3/044* (2006.01)

(52) U.S. Cl.
CPC ............ *G02F 1/13338* (2013.01); *G06F 3/044* (2013.01); *G06F 2203/04111* (2013.01)

(58) Field of Classification Search
CPC ................... G06F 3/0418; G06F 2203/04111; G06F 3/044; G02F 1/13338

USPC .......................................................... 349/12
See application file for complete search history.

(56) References Cited

U.S. PATENT DOCUMENTS

| 5,565,658 A | 10/1996 | Gerpheide et al. |
| 5,869,791 A | 2/1999 | Young |

(Continued)

FOREIGN PATENT DOCUMENTS

| CN | 101673013 | 3/2010 |
| CN | 102193669 | 9/2011 |

(Continued)

OTHER PUBLICATIONS

"Office Action of Europe Counterpart Application", issued on Sep. 19, 2013, p. 1-p. 5.

(Continued)

*Primary Examiner* — Nathanael R Briggs
(74) *Attorney, Agent, or Firm* — Jianq Chyun IP Office (57) ABSTRACT

A touch panel including a first substrate, plural first electrode lines and plural second electrode lines is provided. The first electrode lines and the second electrode lines are respectively arranged on the first substrate and extended along two different directions respectively. Each of the first electrode lines includes plural electrode pads and plural first connecting parts connected therebetween, wherein each of the first connecting parts has two end portions and a center portion, a width of each of the first connecting parts is decreased from the two end portions to the center portion, and corners of connections between the end portions and the corresponding electrode pads are smooth curved surfaces. The second electrode lines are electrically insulated with the first electrode lines, and perpendicular projections of each of the second electrode lines and the corresponding first connecting part on the first substrate are intersected to form an overlap region.

17 Claims, 4 Drawing Sheets (56) References Cited

U.S. PATENT DOCUMENTS

| | | | |
|---|---|---|---|
| 6,137,427 | A | 10/2000 | Binstead |
| 7,920,129 | B2 | 4/2011 | Hotelling et al. |
| 9,046,970 | B2 * | 6/2015 | Iwamoto .............. G06F 3/044 |
| 2009/0160824 | A1 | 6/2009 | Chih-Yung et al. |
| 2009/0315854 | A1 | 12/2009 | Matsuo |
| 2009/0322704 | A1 | 12/2009 | Anno |
| 2010/0044122 | A1 | 2/2010 | Sleeman et al. |
| 2010/0066650 | A1 | 3/2010 | Lee et al. |
| 2010/0085326 | A1 | 4/2010 | Anno |
| 2010/0182253 | A1 | 7/2010 | Park et al. |
| 2010/0220075 | A1 | 9/2010 | Kuo et al. |
| 2010/0261119 | A1 * | 10/2010 | Li et al. ..................... 430/319 |
| 2011/0007020 | A1 * | 1/2011 | Hong et al. ................ 345/174 |
| 2011/0057905 | A1 | 3/2011 | Yu et al. |
| 2011/0090172 | A1 * | 4/2011 | Kaya .................. G06F 3/044 345/174 |
| 2013/0141357 | A1 | 6/2013 | Lo et al. |

FOREIGN PATENT DOCUMENTS

| | | |
|---|---|---|
| CN | 202018648 | 10/2011 |
| EP | 2381346 | 10/2011 |
| GB | 2476131 | 6/2011 |
| GB | 2478804 | 9/2011 |
| JP | 2010-009456 | 1/2010 |
| TW | 201015416 | 4/2010 |
| TW | M410274 | 8/2011 |
| TW | 201218056 | 5/2012 |
| WO | 2005114369 | 12/2005 |

OTHER PUBLICATIONS

"Search Report of Europe Counterpart Application", issued on Feb. 14, 2013, p. 1-p. 3.

"Office Action of U.S. Counterpart Application, U.S. Appl. No. 13/600,233", issued on Feb. 27, 2014, Jul. 31, 2014, p. 1-p. 25.

"Office Action of Taiwan Counterpart Application", issued on Jun. 16, 2014, p. 1-p. 8.

"Office Action of US Parent Application", issued on Mar. 26, 2015, p. 1-p. 12.

"Office Action of Taiwan Counterpart Application," issued on Jun. 22, 2015, p. 1-p. 7.

"Office Action of China Related Application, Application No. 201210320644.X" issued on Jul. 17, 2015, p. 1-p. 8.

"Office Action of European Related Application," issued on Jul. 20, 2015, p. 1-p. 6.

* cited by examiner

TOUCH PANEL

CROSS-REFERENCE TO RELATED APPLICATION

This application is a continuation-in-part application of and claims the priority benefit of U.S. application Ser. No. 13/600,233, filed on Aug. 31, 2012, now pending, which claims the priority benefit of U.S. provisional application Ser. No. 61/567,057, filed on Dec. 5, 2011. The entirety of each of the above-mentioned patent applications is hereby incorporated by reference herein and made a part of this specification.

BACKGROUND OF THE INVENTION

1. Field of the Invention

The present application relates to a touch panel, and more particularly, to a capacitive touch panel.

2. Description of Related Art

As information technology, wireless mobile communication and information appliances have been rapidly developed and applied, to achieve more convenience, more compact and light volume and more user-friendly designs, various information products have changed from using conventional input devices such as key boards or mice to using touch panels. Based on different sensing types, a touch panel can be generally categorized into a resistive touch panel, a capacitive touch panel, an optical touch panel, an acoustic-wave touch panel, and an electromagnetic touch panel. In comparison to other touch panels, the capacitive touch panel is characterized by short response speed, favorable reliability, high definition, and so on. Therefore, the capacitive touch panel is widely used in the electronic products.

The capacitive touch panel constitutes a sensing array via a plurality of intertwined electrode lines (e.g., driving lines and sensing lines), so as to achieve a surface sensing. When a user contacts the touch panel with a finger, the touch panel determines a position in contact with the finger according to a capacitance change on the sensing array. However, parasitic capacitance can easily be generated at intersections of electrode lines in the conventional capacitive touch panel, which is disadvantageous to calculation of the touch position and leads to poor sensing sensitivity. Therefore, in order to reduce influence of parasitic capacitance, a distance between the electrode lines at the intersections is usually increased in a convention design. For instance, a thickness of an insulating material between the electrode lines can be increased. However, it may increase the manufacturing cost and a thickness of the touch panel. In contrast, in case parasitic capacitance is reduced by decreasing a line width of the electrode lines at the intersections, it is prone to disconnections at the turning point where the line width is changing, which then influences the yield rate and reliability in the manufacturing process.

SUMMARY OF THE INVENTION

The present application provides a touch panel having a favorable yield rate and reliability.

The present application provides a touch panel including a first substrate, a plurality of first electrode lines and a plurality of second electrode lines. The first electrode lines are arranged on the first substrate in parallel and respectively extended along a first direction. Each of the first electrode lines includes a plurality of electrode pads and a plurality of first connecting parts, arbitrary two adjacent electrode pads among the electrode pads are connected through one of the first connecting parts correspondingly, and widths of the electrode pads are greater than widths of the first connecting parts, wherein each of the first connecting parts has two end portions configured to connect the electrode pads, and a center portion located between the two end portions, the width of each of the first connecting parts is decreased from the two end portions to the center portion to form a necking shape, and corners of connections between the two end portions of each of the first connecting parts and the corresponding electrode pads are smooth curved surfaces. The second electrode lines are arranged on the first surface in parallel and respectively extended along a second direction, and the second direction is intersected with the first direction. The second electrode lines are electrically insulated with the first electrode lines, and a perpendicular projection of each of the second electrode lines on the first substrate is intersected with a perpendicular projection of the corresponding first connecting part of each of the first electrode lines on the first substrate, so as to respectively form an overlap region.

Based on above, since the width of each of the first connecting parts of each of the first electrode lines is decreased from the two end portions connected with the electrode pad to the center portion between two end portions to form the necking shape, and the corners of the connections between the two end portions of each of the first connecting parts and the corresponding electrode pads are the smooth curve surfaces, stress concentration can be prevented at the connections so that the possibility for the first connecting part to be broken from the connections of the corresponding electrode pads can be reduced. Accordingly, with the first electrode lines of the touch panel of the present embodiment, the first connecting part cannot be easily broken from the connections of the corresponding electrode pads during the manufacturing process or in use, such that yield rate and reliability can both be provided in the manufacturing process.

To make the above features and advantages of the present application more comprehensible, several embodiments accompanied with drawings are described in detail as follows.

DESCRIPTION OF THE EMBODIMENTS

Figure 1:
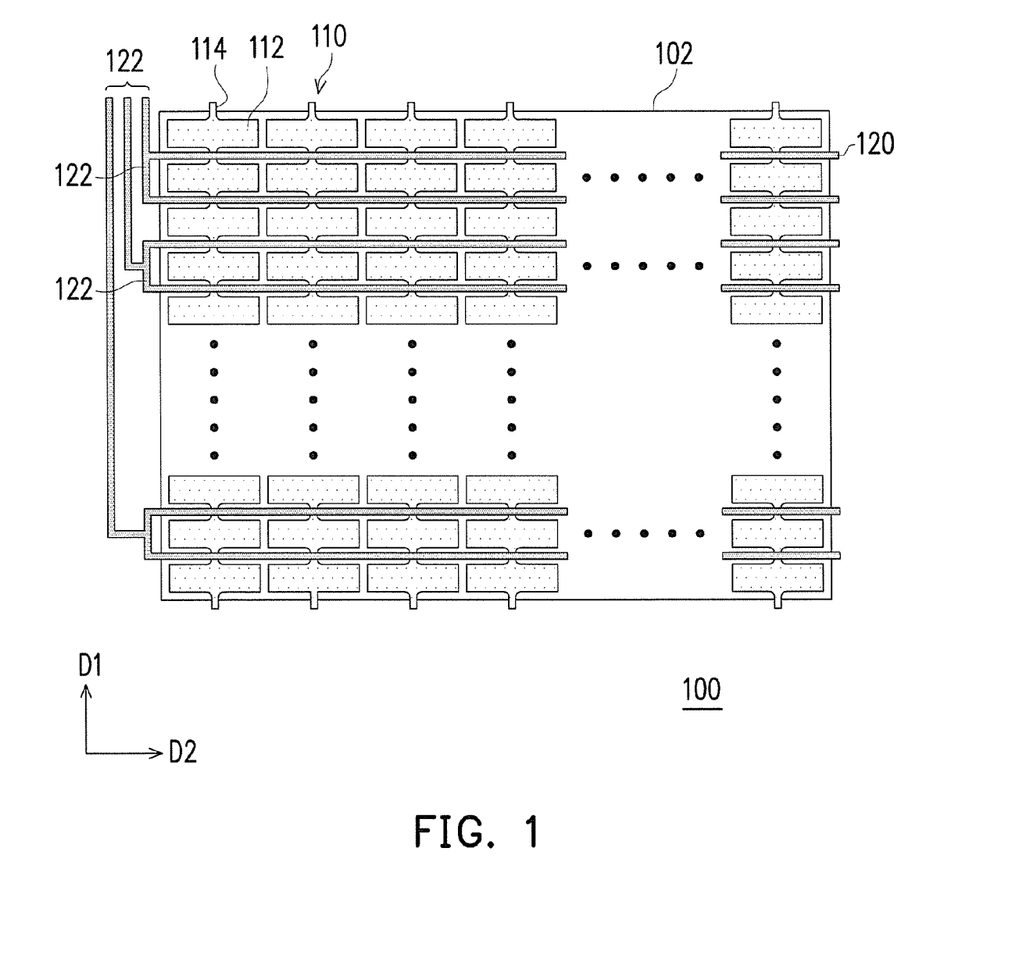
FIG. 1 is a schematic view of a touch panel according to an embodiment of the present application.

FIG. 1 is a schematic view of a touch panel according to an embodiment of the present application. For clarity of the diagram, other possibly present film layers or devices are omitted in FIG. 1. Referring to FIG. 1, in the present embodiment, a touch panel 100 includes a first substrate 102, a plurality of first electrode lines 110 and a plurality of second electrode lines 120. The first electrode lines 110 are arranged on the first surface 102 in parallel and respectively extended along a first direction D1. Each of the first electrode lines 110 includes a plurality of first electrode pads 112 and a plurality of first connecting parts 114. Arbitrary two adjacent electrode pads 112 are connected through one of the first connecting parts 114 correspondingly.

In addition, the second electrode lines 120 are arranged on the first surface 102 in parallel and respectively extended along a second direction D2, and the second direction D2 is intersected with the first direction D1. The second electrode lines 120 are electrically insulated with the first electrode lines 110, and the second electrode lines 120 extended along the second direction D2 are intersected with the first electrode lines 110 extended along the first direction D1, so as to form a sensing array on the first substrate 102. The first electrode lines 110 and the second electrode lines 120 in the present embodiment are, for example, a combination of driving lines and sensing lines, and a material thereof can be transparent conductive materials such as Indium Tin Oxide (ITO) or Indium Zinc Oxide (IZO), however, types and materials of the first electrode lines 110 and the second electrode lines 120 are not limited in the present application.

Figure 2:
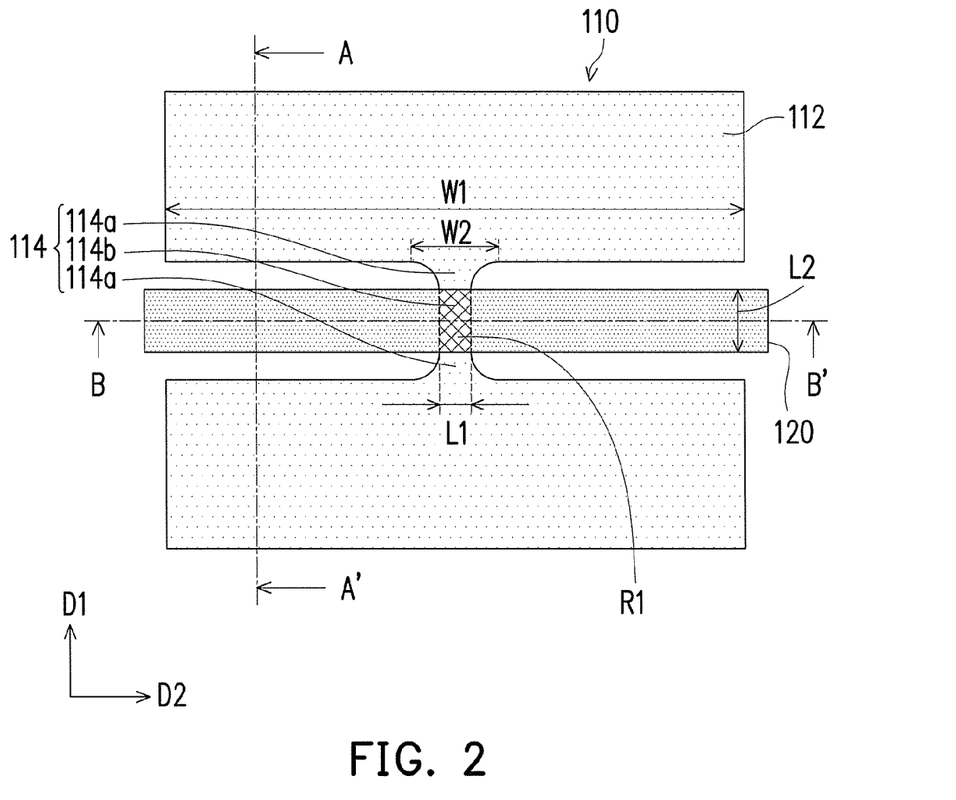
FIG. 2 is a partially enlarged view illustrating the first electrode lines and the second electrode lines depicted FIG. 1.

FIG. 2 is a partially enlarged view illustrating the first electrode lines and the second electrode lines depicted FIG. 1. Referring to FIG. 1 and FIG. 2, in the present embodiment, since the second electrode lines 120 are intersected with the first electrode lines 110, thus a perpendicular projection of each of the second electrode lines 120 on the first substrate 102 is intersected with a perpendicular projection of the corresponding first connecting part 114 of each of the first electrode lines 110 on the first substrate 102, so as to respectively form an overlap region R1. Parasitic capacitance between the first electrode lines 110 and the second electrode lines 120 can be effectively reduced if the overlap region R1 between the first electrode line 110 and the second electrode line 120 is reduced.

In the present embodiment, a length of the overlap region R1 on the second direction D2 is first being reduced by reducing a width of the first connecting part 114 of the first electrode line 110. Referring to FIG. 2, in the present embodiment, a width W1 of the electrode pad 112 of the first electrode line 110 is greater than a width W2 of the first connecting part 114. Herein, the width W1 of the electrode pad 112 refers to a length of the electrode pad 112 on the second direction D2, and the width W2 of the first connecting part 114 refers to a length of the first connecting part 114 on the second direction D2. In this case, since the width W2 of the first connecting part 114 becomes smaller, the length L1 of the overlap region R1 on the second direction D2 becomes smaller, so that an area of the overlap region R1 is reduced to reduce parasitic capacitance generated at the intersections of the first electrode lines 110 and the second electrode lines 120.

On the other hand, in the present embodiment, each of the first connecting parts 114 has two end portions 114a configured to connect the electrode pads 112, and a center portion 114b located between the two end portions 114a. The width W2 of each of the first connecting parts 114 is decreased from the two end portions 114a to the center portion 114b to form a necking shape. In other words, each of the first connecting parts 114 has a maximum width at the two end portions 114a, and a minimum width at the center portion 114b. Said width W2 of the first connecting part 114 refers to the maximum width provided by each of the first connecting parts 114 at the two end portions 114a, and the length L1 of the overlap region R1 on the second direction D2 refers to the minimum width provided by each of the connecting parts 114 at the center portion 114b. Therefore, in case when the width W2 of the first connecting part 114 is reduced in order to reduce the area of the overlap region R1, practically the length L1 of the overlap region R1 on the second direction D2 is smaller than the width W2.

Figure 3A:
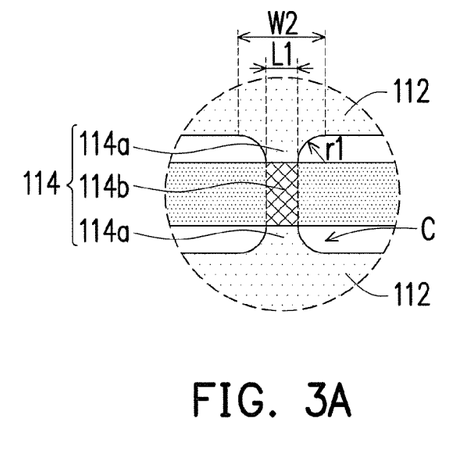
FIG. 3A is a partially enlarged view of the first connecting part depicted in FIG. 2.

FIG. 3A is a partially enlarged view of the first connecting part depicted in FIG. 2. Referring to FIG. 2 and FIG. 3A together, in the present embodiment, corners of connections C between the two end portions 114a of each of the first connecting parts 114 and the corresponding electrode pads 112 are smooth curved surfaces, and two side surfaces of the center portion 114b of each of the first connecting parts 114 are planes. Since the width W2 of each of the first connecting parts 114 is decreased from the two end portions 114a to the center portion 114b to form the necking shape, and the corners of the connections C between the two end portions 114a and the corresponding electrode pads 112 are the smooth curved surfaces, a possibility for the first connecting part 114 to be broken from the connections C of the corresponding electrode pads 112 can be reduced while reducing the width W2 of the first connecting part 114. Said smooth curved surfaces of the corners of the connections C are, for example, arc curved surfaces with a radius of curvature being r1, but the first connecting parts 114 are not limited to the shape as described above.

Figure 3B:
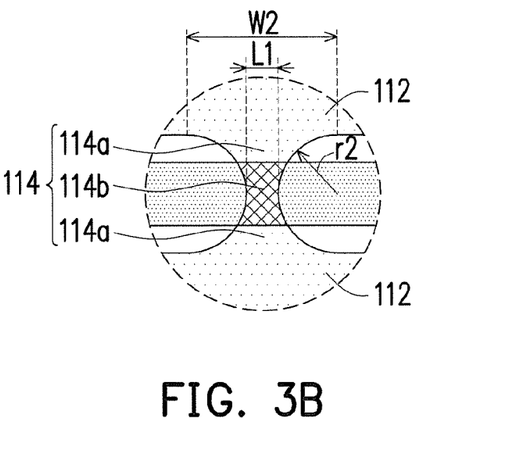
FIG. 3B is a partially enlarged view of the first connecting part according to another embodiment of the present application.

FIG. 3B is a partially enlarged view of the first connecting part according to another embodiment of the present application. Referring to FIG. 3B, in the present embodiment, the corners of the connections C between the two end portions 114a of each of the first connecting parts 114 and the corresponding electrode pads 112 are smooth curved surfaces. In addition, the corners of the connections C between the two end portions 114a of each of the first connecting parts 114 and the corresponding electrode pads 112 form arc curved surfaces with a radius of curvature being r2 together with the two side surfaces of the center portion 114b. Since each of the connecting parts 114 is in the necking shape, and the corners of the connections C form the arc curved surfaces together with the two side surfaces of the center portion 114b, the possibility for the first connecting part 114 to be broken from the connection C of the corresponding electrode pad 112 can be reduced while reducing the width W2 of the first connecting part 114.

Figure 3C:
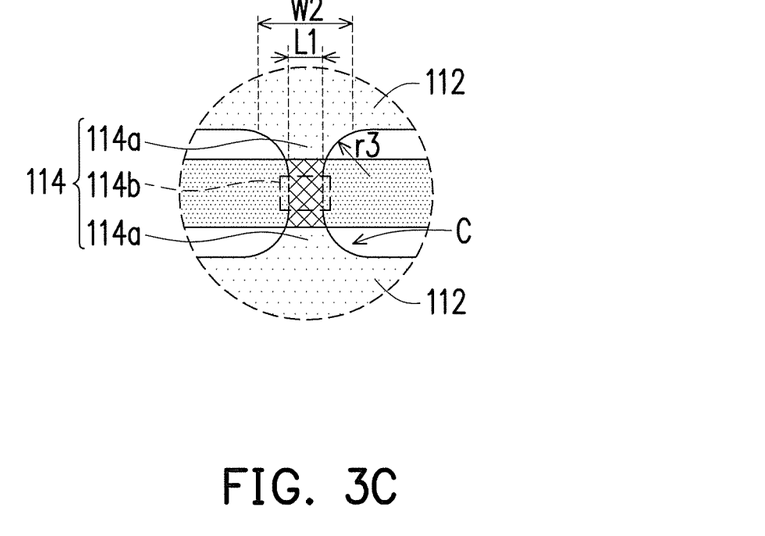
FIG. 3C is a partially enlarged view of the first connecting part according to another embodiment of the present application.

FIG. 3C is a partially enlarged view of the first connecting part according to another embodiment of the present application. Referring to FIG. 3C, in the present embodiment, the corners of the connections C between the two end portions 114a of each of the first connecting parts 114 and the corresponding electrode pads 112 are smooth curved surfaces. In addition, each of the center portions 114b is located within the corresponding overlap region R1, and two opposite side surfaces of each of the center portion 114b are planes. The corners of the connections C between the two end portions 114a of each of the first connecting parts 114 and the corresponding electrode pads 112 form arc curved surfaces with a radius of curvature being r3, and the arc curved surfaces with the radius of curvature being r3 are extended into the overlap region R1 and connect the two opposite side surfaces of each of the center portion 114b respectively. Since each of the connecting parts 114 is in the necking shape, and the corners of the connections C form the arc curved surfaces and extend into the overlap region R1, the possibility for the first connecting part 114 to be broken from the connection C of the corresponding electrode pad 112 can be reduced while reducing the width W2 of the first connecting part 114. Besides the three embodiments as described above, the first connecting parts 114 can also be other shapes. For instance, in other embodiments, the two side surfaces of each of the first connecting parts 114 and the corners of the connections C can also form ellipse curved surfaces or parabolic curved surfaces, the shapes of the first connecting parts 114 are not limited in the present application.

Referring FIG. 2, besides that the area of the overlap region R1 can be reduced by reducing the width W2 of the first connecting parts 114, the present embodiment is also in consideration of a relation between the length L1 of the overlap region R1 on the second direction D2 and a length L2 of the overlap region R1 on the first direction D1. In the present embodiment, the length L1 of the overlap region R1 on the second direction D2 is smaller than or equal to the length L2 of the overlap region R1 on the first direction D1. Herein, the length L1 of the overlap region R1 on the second direction D2 refers to the minimum width provided by the first connecting part 114 at the center portion 114b, and the length L2 of the overlap region R1 on the first direction D1 refers to a width of the second electrode line 120. The width of the second electrode line 120 refers to a length of the second electrode line 120 on the first direction D1. Since the second electrode line 120 in the present embodiment is a strip electrode line, thus the length of the second electrode line 120 on the first direction D1 is the length L2 of the overlap region R1 on the first direction D1. In other words, the overlap region R1 formed by the first connecting part 114 of the first electrode line 110 and the second electrode line 120 on the first substrate 102 has the length L1 along the second direction D2 (the minimum width of the first connecting part 114) and the length L2 along the first direction D1 (the width of the second electrode line 120), and the length L1 is smaller than or equal to the length L2.

Further, referring back to FIG. 1, in the present embodiment, the touch panel 100 further includes a plurality of connecting parts 122 configured to connect the second electrode lines 120 for signal transmission. The second connecting parts 122 are adjacent to an edge of the first substrate 102, and each two adjacent second electrode lines 120 are connected through the corresponding second connecting part 122. However, in other embodiment, each three or more of the adjacent second electrode lines 120 can also be connected through by the corresponding second connecting part 122. Accordingly, in the present embodiment, one signal sensing region (not illustrated) is capable of corresponding to two, three or more than three of the second electrode lines 120 so as to facilitate in reducing the width of the second electrode lines 120 individually. Of course, in other embodiments, each of the second electrode lines 120 can also be separately connected to the second connecting 122.

In view of above, the present embodiment provides a favorable sensing sensitivity by reducing the overlap region R1 between the first electrode line 110 and the second electrode line 120 to reduce parasitic capacitance therebetween. Meanwhile, the corners of the connections C between the first connecting parts 114 in the necking shape and the corresponding electrode pads 112 being smooth curved surfaces can prevent stress concentration, so that the possibility for the first connecting part 114 to be broken from the connections C of the corresponding electrode pads 112 can be reduced. In other words, with the first electrode lines 110 of the touch panel 100 of the present embodiment, the first connecting part 114 cannot be easily broken from the connections C of the corresponding electrode pads 112 during the manufacturing process or in use.

Figure 4:
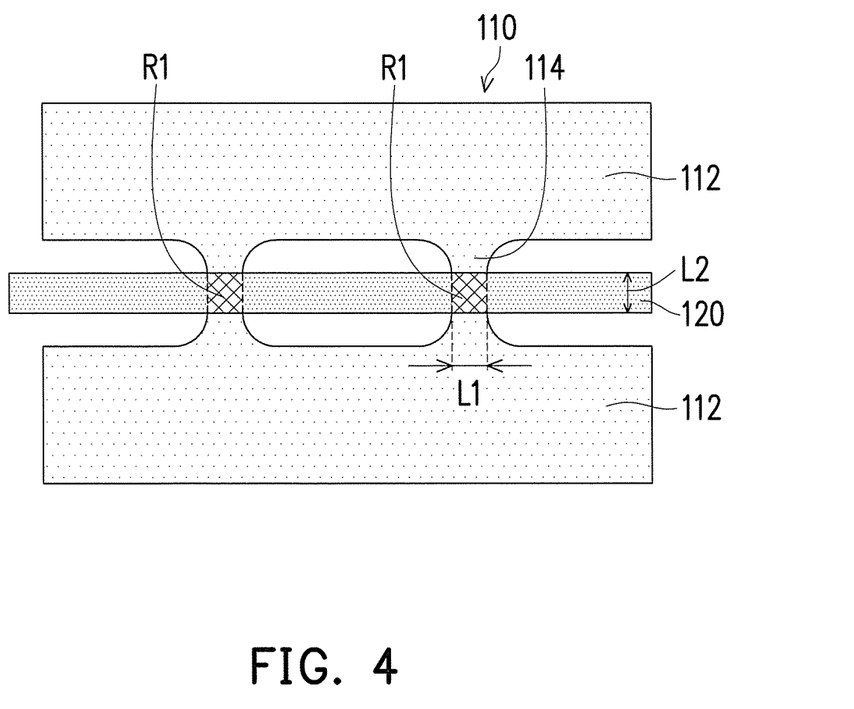
FIG. 4 is a partially enlarged view illustrating the first electrode lines and the second electrode lines according to another embodiment of the present application.

FIG. 4 is a partially enlarged view illustrating the first electrode lines and the second electrode lines according to another embodiment of the present application. Referring to FIG. 2 and FIG. 4, in the embodiment of FIG. 2, the arbitrary two adjacent electrode pads 112 of each of the first electrode lines 110 are connected through one of the first connecting parts 114 correspondingly. But, in the embodiment of FIG. 4, the arbitrary two adjacent electrode pads 112 of each of the first electrode lines 110 can be connected through two of the first connecting parts 114 correspondingly. A perpendicular projection of each of the second electrode lines 120 on the first substrate 102 is intersected with a perpendicular projection of the corresponding first connecting part 114 of each of the first electrode lines 110 on the first substrate 102, so as to respectively form the overlap regions R1, and two overlap regions R1 are provided between each of the first electrode lines 110 and each of the second electrode lines 120. However, in other embodiments, the arbitrary two adjacent electrode pads 112 of each the first electrode lines 110 can be connected through more of the first connecting parts 114 correspondingly, and the present application is not limited thereto.

Figure 5A:
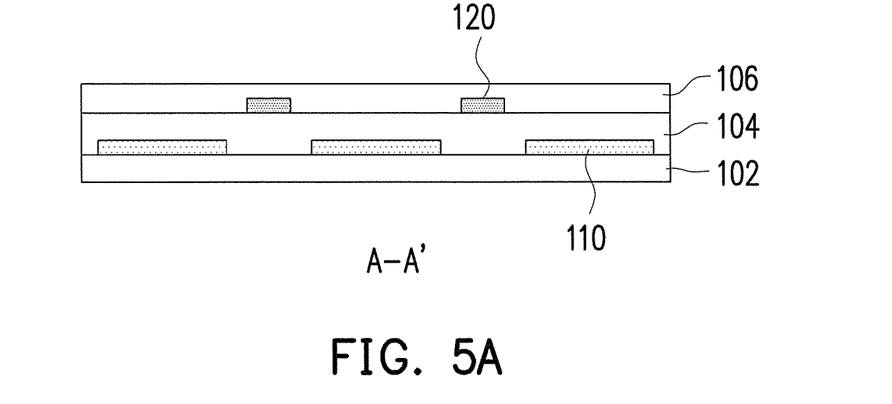
FIG. 5A to FIG. 5C are cross-sectional views of the touch panel of the present application in different embodiments.
Figure 5B:
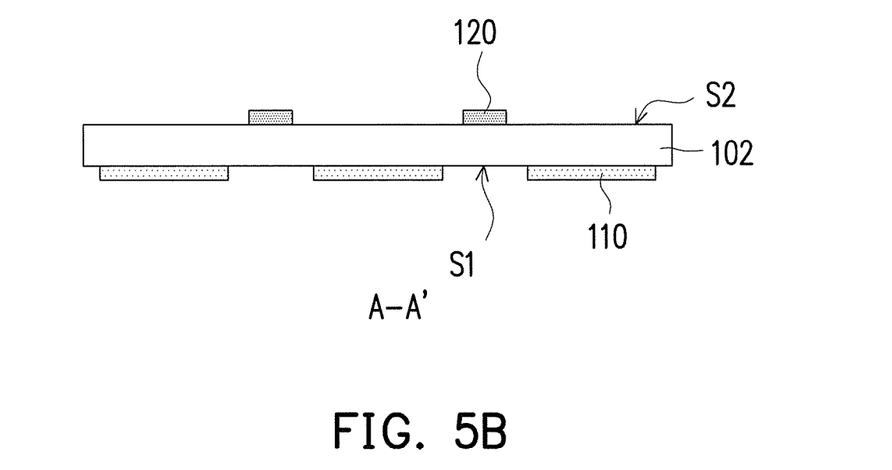
Figure 5C:
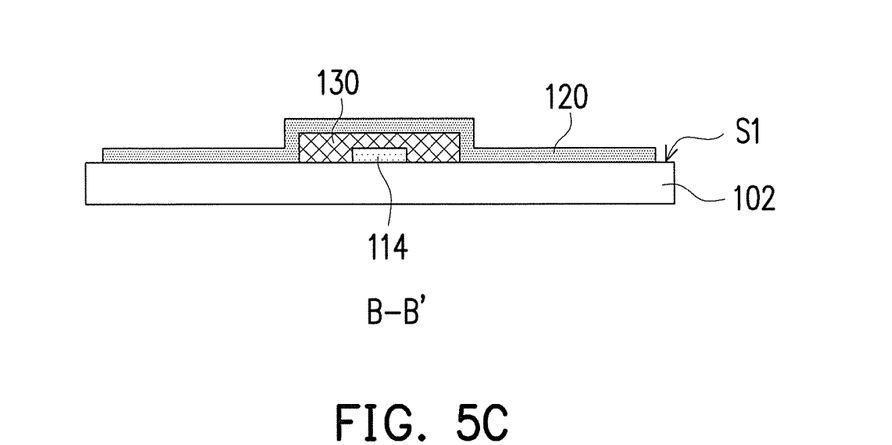

FIG. 5A to FIG. 5C are cross-sectional views of the touch panel of the present application in different embodiments. The design philosophy as described above can be applied in various touch panels. The following description is explained in sequence with reference to various possible sectional structures of the touch panel 100 as depicted in FIG. 5A to FIG. 5C.

First, referring to FIG. 2 and FIG. 5A. FIG. 5A illustrates a possible sectional structure of the touch panel 100 along as line A-A' depicted FIG. 2. In the present embodiment, the touch panel 100 further includes a second substrate 104. The second substrate 104 is disposed on the first substrate 102, and the first electrode lines 110 and the second electrode lines 120 are respectively located on two opposite sides of the second substrate 104. More specifically, the first electrode lines 110 are located on the first substrate 102, and the second electrode lines 120 are located on the second substrate 104. The second substrate 104 is disposed on the first substrate 102 and covers the first electrode lines 110. In addition, a protective layer 106 can be covered on the second substrate 104 to protect the second electrode lines 120. For the manufacturing process, the first electrode lines 110 and the second electrode line 120 can first be fabricated on the first substrate 102 and the second substrate 104 respectively, followed by attaching the first substrate 102 and the second substrate 104 to each other, and covering the protective layer 106 on the second substrate 104. The first substrate 102 and the second substrate 104 can be transparent substrates such as glass or PET (Polyethylene Terephthalate), which are attached to each other by optically clear adhesive (OCA), however, materials and attaching methods of the first substrate 102 and the second substrate 104 are not limited in the present application.

In the present embodiment, since the overlap region R1 between the first electrode line 110 and the second electrode line 120 is reduced to reduce parasitic capacitance therebetween as described above, in case the capability of the touch chip remains unchanged, a distance between the first electrode line 110 and the second electrode line 120 can be properly reduced, which means that a thickness of the second substrate 104 can be thinner. Accordingly, an amount of the second substrate 104 being used can be fewer so as to save the manufacturing costs, and an overall thickness of the touch panel 100 can be relatively smaller while showing a preferable transmittance.

Referring to FIG. 2 and FIG. 5B. FIG. 5B illustrates another possible sectional structure of the touch panel 100 along the line A-A' depicted FIG. 2. In the present embodiment, the first substrate 102 has a first surface S1 and a second surface S2 opposite to the first surface S1, in which the first electrode lines 110 are located on the first surface S1 and the second electrode lines 120 are located on the second surface S2. For the manufacturing process, for example, the first electrode lines 110 and the second electrode lines 120 are respectively fabricated on the first surface S1 and the second surface S2 of the first substrate 102, with the first substrate 102 as a base. The first substrate 102 can be transparent substrates such as glass or PET, however, materials of the first substrate 102 and the second substrate 104 are not limited in the present application.

Similarly, in the present embodiment, since the overlap region R1 between the first electrode line 110 and the second electrode line 120 is reduced to reduce parasitic capacitance therebetween as described above, in case the capability of the touch chip remains unchanged, a distance between the first electrode line 110 and the second electrode line 120 can be properly reduced, which means that a thickness of the first substrate 102 can be reduced. Accordingly, an amount of the first substrate 102 being used can be fewer so as to save the manufacturing costs, and an overall thickness of the touch panel 100 can be relatively smaller while showing a preferable transmittance.

Referring to FIG. 2 and FIG. 5C together. FIG. 5C illustrates yet another possible sectional structure of the touch panel 100 along a line B-B' depicted FIG. 2. In the present embodiment, the first substrate 102 has a first surface S1, and the first electrode lines 110 and the second electrode lines 120 are located on the first surface S1 of the first substrate 102. The first electrode lines 110 and the second electrode lines 120 are required to be electrically insulated to each other, thus one of the first electrode line 110 and the second line 120 needs to be crossed over another one of the first electrode line 110 and the second line 120. More specifically, in the present embodiment, a part of the second electrode line 120 corresponding to the first connecting part 114 of the first electrode line 110 crosses over the first electrode line 110 and located above the first connecting part 114, so as to form the overlap area R1 as described above. Moreover, the touch panel 100 further includes an insulating material 130. The insulating material 130 is located on the first surface S1 and between the second electrode lines 120 and the corresponding first connecting parts 114 of the first electrode lines 110 so as to separate the first electrodes line 110 and the second electrode lines 120. The first substrate 102 can be transparent substrates such as glass or PET, however, materials of the first substrate 102 and the second substrate 104 are not limited in the present application. Furthermore, in other embodiment, the first connecting part 114 of the first electrode line 110 can also cross over the second electrode line 120 and located above the second electrode line 120, and the cross-over method being used is not limited in the present application.

Similarly, in the present embodiment, since the overlap region R1 between the first electrode line 110 and the second electrode line 120 is reduced to reduce parasitic capacitance therebetween as described above, in case the capability of the touch chip remains unchanged, a distance between the first electrode line 110 and the second electrode line 120 can be properly reduced, which means that a thickness of the insulating material 130 can be reduced. Accordingly, an amount of the insulating material 130 being used can be fewer so as to save the manufacturing costs, and an overall thickness of the touch panel 100 can be relatively smaller while showing a preferable transmittance.

Although plural possible structures of the touch panel 100 of the present application are illustrated in the previous embodiments, they are not intended to limit the present application. For instance, shapes and layouts of the first electrode line 110 and the second electrode line 120 are not limited to the description in the previous embodiments.

In summary, the overlap region between the first electrode line and the second electrode line can be reduced by the touch panel provided in the present application to reduce parasitic capacitance therebetween, and the distance therebetween can also be further reduced. Accordingly, amounts of materials being used can be fewer so as to save the manufacturing costs, and an overall thickness of the touch panel can be relatively smaller while showing a preferable transmittance. Meanwhile, since the widths of the first connecting parts of the first electrode lines are decreased from the two end portions of the electrode pad to the center portion to form the necking shape, and the corners of the connections between the two end portions of first connecting parts and the corresponding electrode pads are the smooth curve surfaces, stress concentration can be prevented at the connection so that the possibility for the first connecting part to be broken from the connections of the corresponding electrode pads can be reduced. Accordingly, with the first electrode lines of the touch panel of the present embodiment, the first connecting part cannot be easily broken from the connections of the corresponding electrode pads during the manufacturing process or in use, such that yield rate and reliability can both be ensured in the manufacturing process.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A touch panel, comprising:
   a first substrate;
   a plurality of first electrode lines arranged on the first substrate in parallel and respectively extended along a first direction, each of the first electrode lines including a plurality of electrode pads and a plurality of first connecting parts, arbitrary two adjacent electrode pads among the electrode pads being connected through one of the first connecting parts correspondingly, and a width of each of the electrode pads in the second direction being consistent over the entire length of the electrode pad and greater than widths of the first connecting parts, wherein each of the first connecting parts has two end portions configured to connect the electrode pads, and a center portion located between the two end portions, the width of each of the first connecting parts is decreased from the two end portions to the center portion to form a necking shape, and corners of connections between the two end portions of each of the first connecting parts and the corresponding electrode pads are smooth curved surfaces, wherein the smooth curved surfaces are arc curved surfaces; and
   a plurality of second electrode lines arranged on the first substrate in parallel and respectively extended along a second direction, the second direction being intersected with the first direction, the second electrode lines being electrically insulated with the first electrode lines, a width of each of the second electrode lines is smaller than a width of each of the electrode pads, and a perpendicular projection of each of the second electrode lines on the first substrate being intersected with a perpendicular projection of the corresponding first connecting part of each of the first electrode lines on the first substrate, so as to respectively form an overlap region, and a length of the overlap region on the second direction is smaller than a length of the overlap region on the first direction.

2. The touch panel of claim 1, further comprising a second substrate disposed on the first substrate, and the first electrode lines and the second electrode lines being respectively located on two opposite sides of the second substrate.

3. The touch panel of claim 1, wherein the first substrate has a first surface and a second surface opposite to the first surface, the first electrode lines being located on the first surface, and the second electrode lines being located on the second surface.

4. The touch panel of claim 1, further comprising an insulating material, wherein the first electrode lines and the second electrode lines are located on a first surface of the first substrate, and the insulating material is located on the first surface and between the second electrode lines and the first connecting parts of the corresponding first electrode lines.

5. The touch panel of claim 1, wherein the corners of the connections between the two end portions of each of the first connecting parts and the corresponding electrode pads forms an arc curved surface together with two side surfaces of the center portion.

6. The touch panel of claim 1, wherein each of the center portion being located within the corresponding overlap region, two opposite side surfaces of each of the center portion being a plane, the corners of the connections between the two end portions of each of the first connecting parts and the corresponding electrode pads forming an arc curved surface, and the arc curved surface being extended into the overlap region and connecting the two opposite side surfaces of each of the center portion.

7. The touch panel of claim 1, wherein the arbitrary two adjacent electrode pads of each of the first electrode lines are connected through two of the corresponding first connecting parts.

8. The touch panel of claim 1, further comprising a plurality of second connecting parts adjacent to an edge of the first substrate, and each of more than two adjacent second electrode lines connecting through the second connecting part.

9. A touch panel, comprising:
a first substrate;
a plurality of first electrode lines arranged on the first substrate in parallel and respectively extended along a first direction, each of the first electrode lines including a plurality of electrode pads and a plurality of first connecting parts, arbitrary two adjacent electrode pads among the electrode pads being connected through one of the first connecting parts correspondingly, and a width of each of the electrode pads in the second direction being consistent over the entire length of the electrode pad and greater than widths of the first connecting parts, wherein each of the first connecting parts has two end portions configured to connect the electrode pads, and a center portion located between the two end portions, the width of each of the first connecting parts is decreased from the two end portions to the center portion to form a necking shape, and corners of connections between the two end portions of each of the first connecting parts and the corresponding electrode pads are smooth curved surfaces; and
a plurality of second electrode lines arranged on the first substrate in parallel and respectively extended along a second direction, the second direction being intersected with the first direction, the second electrode lines being electrically insulated with the first electrode lines, a width of each of the second electrode lines is smaller than a width of each of the electrode pads, and a perpendicular projection of each of the second electrode lines on the first substrate being intersected with a perpendicular projection of the corresponding first connecting part of each of the first electrode lines on the first substrate, so as to respectively form an overlap region, and a length of the overlap region on the second direction is smaller than a length of the overlap region on the first direction.

10. The touch panel of claim 9, further comprising a second substrate disposed on the first substrate, and the first electrode lines and the second electrode lines being respectively located on two opposite sides of the second substrate.

11. The touch panel of claim 9, wherein the first substrate has a first surface and a second surface opposite to the first surface, the first electrode lines being located on the first surface, and the second electrode lines being located on the second surface.

12. The touch panel of claim 9, further comprising an insulating material, wherein the first electrode lines and the second electrode lines are located on a first surface of the first substrate, and the insulating material is located on the first surface and between the second electrode lines and the first connecting parts of the corresponding first electrode lines.

13. The touch panel of claim 9, wherein the smooth curved surfaces are arc curved surfaces.

14. The touch panel of claim 9, wherein the corners of the connections between the two end portions of each of the first connecting parts and the corresponding electrode pads forms an arc curved surface together with two side surfaces of the center portion.

15. The touch panel of claim 9, wherein each of the center portion being located within the corresponding overlap region, two opposite side surfaces of each of the center portion being a plane, the corners of the connections between the two end portions of each of the first connecting parts and the corresponding electrode pads forming an arc curved surface, and the arc curved surface being extended into the overlap region and connecting the two opposite side surfaces of each of the center portion.

16. The touch panel of claim 9, wherein the arbitrary two adjacent electrode pads of each of the first electrode lines are connected through two of the corresponding first connecting parts.

17. The touch panel of claim 9, further comprising a plurality of second connecting parts adjacent to an edge of the first substrate, and each of more than two adjacent second electrode lines connecting through the second connecting part.

* * * * *